Dec. 4, 1962 R. J. SIMPSON 3,066,818
FORK LIFT MOUNTING UNIT FOR A WHEEL TRACTOR
Filed Oct. 11, 1960 2 Sheets-Sheet 1
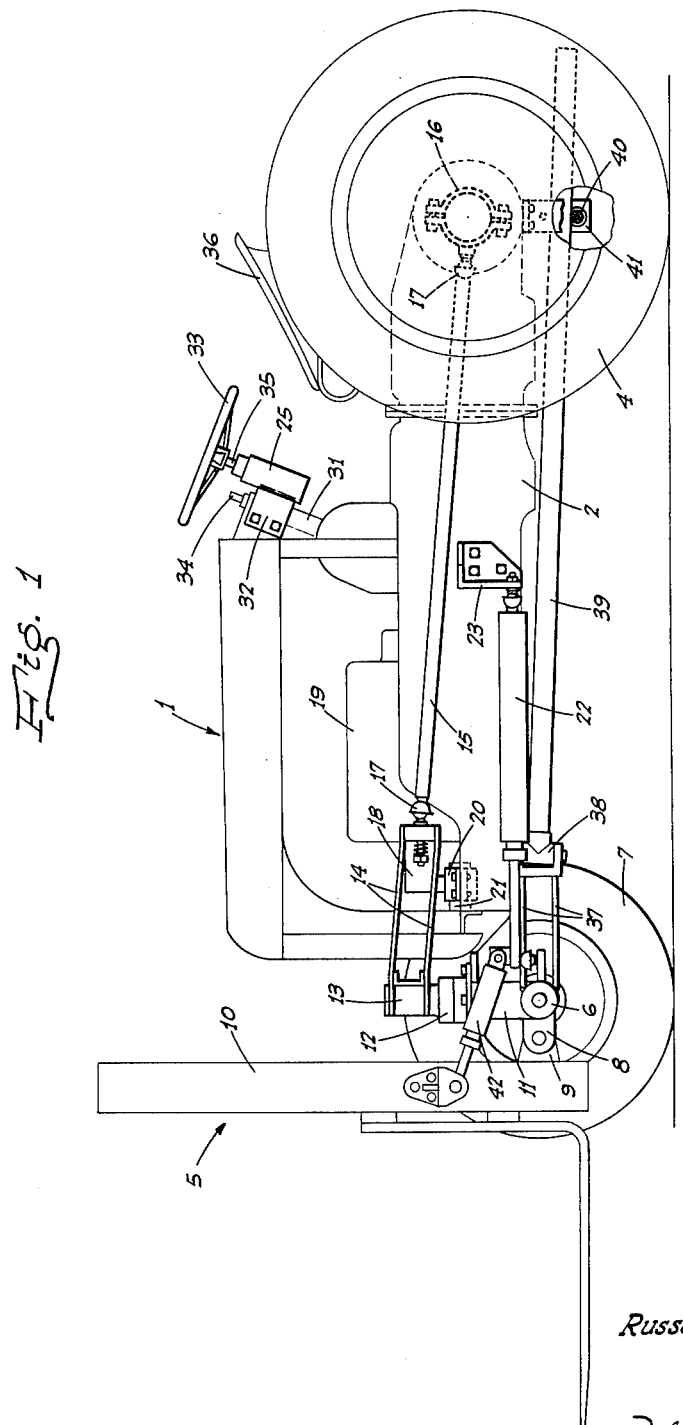
INVENTOR
Russell J. Simpson
Webster & Webster
ATTORNEYS

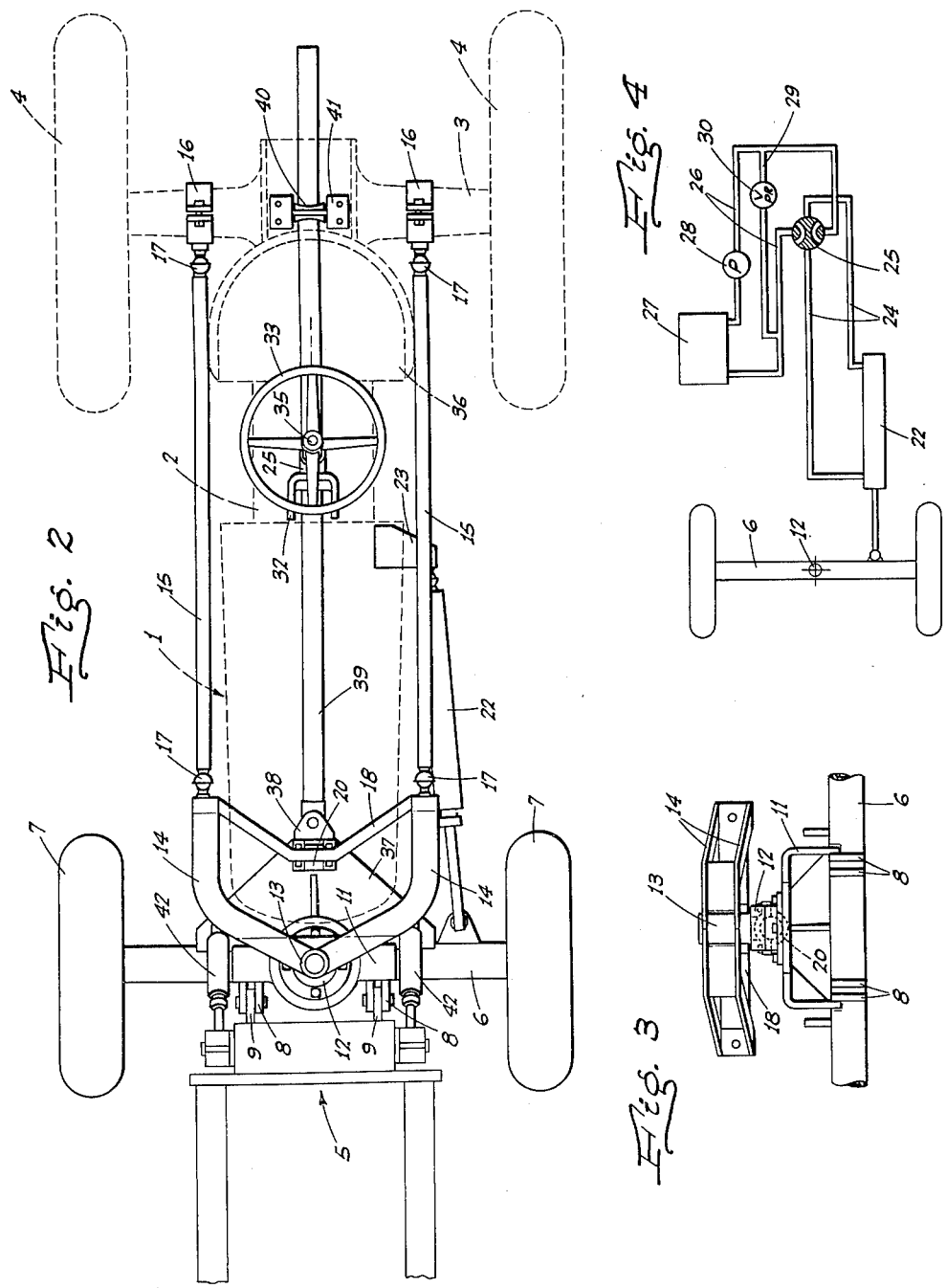

United States Patent Office 3,066,818
Patented Dec. 4, 1962

3,066,818
FORK LIFT MOUNTING UNIT FOR
A WHEEL TRACTOR
Russell J. Simpson, 2433 E. Flora St., Stockton, Calif.
Filed Oct. 11, 1960, Ser. No. 61,985
9 Claims. (Cl. 214—671)

This invention relates to fork lift units such as are mounted on tractors or other self-propelled vehicles for various industrial and agricultural purposes, and which are ordinarily mounted in rigid relationship with the chassis of the vehicle.

One of the objects of my invention is to mount such a fork lift unit in connection with the steerable front wheels of a tractor for movement to the right or left therewith. The forwardly facing tractor operator thus has excellent and full control of the positioning of the forks of the lift unit relative to a load to be picked up.

The weight of the fork lift unit and its load, being ahead of the tractor, tends to lift the rear end of such tractor and reduce the tractive efficiency of the rear driven wheels of the tractor. It is therefore another and important object of the invention to provide what I believe to be a novel torque and hold-down device which counteracts the tendency of the rear end of the tractor to lift, and also prevents any tendency of the tractor to tilt laterally when the loaded fork lift is turned to one side or the other.

It has been found that neither the conventional front wheel mounts, nor the manual steering mechanisms of wheeled tractors are sturdy or powerful enough to take the strains imposed by mounting a fork lift unit on such wheel mounts. It is therefore still another object of the invention to provide a special wheel axle and wheels for the fork lift unit, and a supporting structure for the axle, arranged so that such structure can be readily and removably mounted on the tractor in place of the usual wheels and axle. This structure and the fork lift are arranged so that they may be readily detached from the tractor, and the conventional wheels remounted thereon, when the usually seasonal need for the fork lift has passed.

I have also provided a hydraulic steering mechanism for the new wheel and axle unit which, while preferably using the steering wheel of the manual steering device, does not interfere with the operation of such device when the special axle and fork lift are detached from the tractor and the original wheels are replaced.

It is also an object of the invention to provide a fork lift mounting unit for a wheel tractor which is designed for ease and economy of manufacture.

Still another object of the invention is to provide a practical, reliable, and durable fork lift mounting unit for a wheel tractor, and one which will be exceedingly effective for the purpose for which it is designed.

These objects are accomplished by means of such structure and relative arrangement of parts as will fully appear by a perusal of the following specification and claims.

In the drawings:

FIG. 1 is a side elevation of the fork lift mounting unit shown as connected to a conventional type of wheeled tractor; one of the front wheels of the unit being removed.

FIG. 2 is a plan view of the fork lift mounting and steering structure shown in the position occupied thereby when mounted on a tractor; the outline of the latter being indicated by broken lines.

FIG. 3 is a fragmentary front end view of the front axle and its mounting structure, detached from the fork lift and from the tractor.

FIG. 4 is a diagram of the hydraulic steering mechanism.

Referring now more particularly to the drawings and to the characters of reference marked thereon, the tractor to which the conventional fork lift is applied is indicated generally at 1, and includes an elongated combination frame and drive mechanism housing 2 supported at the rear by a transverse axle housing 3 on which the rear driven wheels 4 are mounted.

The novel mounting structure for a conventional form of fork lift unit, indicated generally at 5, comprises a particular arrangement of parts, now to be described.

Adapted to be directly ahead of the forward end of the tractor member 2 is a rigid transverse axle 6, on the ends of which wheels 7 are mounted. These wheels may be of the single or dual-tire type, as operating conditions may require.

The axle is provided with laterally spaced, forwardly projecting ears 8 cooperating with and pivotally connected to rearwardly projecting ears 9 on the upstanding side beams 10 of the fork lift. Upstanding from the central portion of the axle 7 is a frame 11 on which is mounted the lower member of a fifth wheel unit 12, the upper member of which is provided with an upstanding stem 13. The axis of the fifth wheel is centralized on the axle 6.

Rigid with and projecting rearwardly from stem 13 in straddling relation to the forward portion of the tractor are arms 14, preferably arranged as vertically spaced pairs. Compression bars 15 extend between the rear ends of arms 14 and brackets 16 clamped on the rear axle housing 3. The bars 15 are connected at their ends to said arms 14 and brackets 16 by ball and socket joints 17 or the like.

A transverse beam 18 connects the rear ends of arms 14 and is deflected forwardly toward the center so as to miss the forward end of the engine block 19 of the tractor. Centrally between its ends the beam 18 is secured to a depending split sleeve 20 which extends lengthwise of the tractor and turnably embraces a stub shaft 21 fixed on the tractor and on which the usual front axle of the tractor, now removed, is rockably mounted.

By means of the above arrangement it will be seen that the front axle 6, together with the fork lift 5, can freely turn about the fifth wheel 12 as an axis, while at the same time the entire axle supporting structure can rock about the shaft 21 to compensate for any lateral variations in the ground contour.

Steering of the front axle is effected by a hydraulic manually controlled mechanism. Such mechanism comprises a hydraulic ram 22 swivelly connected at one end to the axle 6 to one side of the tractor and at the other end to a bracket 23 secured to the corresponding side of the tractor frame 2. Conduits 24 extend from the ends of the ram 22 to a four-way valve 25. Other conduits 26 lead to the valve from a fluid supply tank 27, one of such conduits having a pump 28 therein drawing away from the tank. As usual, a bypass conduit 29 having a pressure relief valve 30 therein connects the conduits 26 between the valve 25 and the pump 28.

The valve 25, which is of a cylindrical rotary type, is disposed on the tractor just to the rear of the conventional steering post housing 31 thereon, and is secured to such housing by a bracket 32. The steering wheel 33 is removed from its normal position on the post 34 and is applied to the upwardly projecting stem 35 of valve 25. By reason of the above arrangement, the position of the steering wheel is not materially altered, and such wheel is still therefore convenient for operation by the occupant of the tractor seat 36.

A positive hold-down and stabilizing action is imparted to the rear axle housing and wheels of the tractor when the fork lift is under load, by the following means:

Rigid with and projecting rearwardly from the axle 6 is a plate unit 37 disposed at such a level as to clear the bottom of the tractor frame 2. Secured to the rear end of the unit 37, centrally of the width thereof, is one member of a swivel vertical-axis joint 38, the other member of which is secured on the forward end of a heavy torque and hold-down bar 39. This bar extends under the tractor member 2 to a point rearwardly of the rear axle housing 3. In the plane of such housing, centrally of the width of the tractor, bar 39 is supported and confined against lateral displacement by concave rollers 40; the rear end portion of the bar being cylindrical in section. These rollers are turnably mounted on and between side plates 41, which are secured in a suitable manner to—and depend from—the tractor housing 2.

By reason of this arrangement it will be seen that the weight of the heavy bar 39 exerts a definite hold-down pressure on the tractor at the rear end thereof. It will also be seen that such pressure will be applied to the tractor centrally of the width thereof regardless of whether the fork lift is in a straight-ahead position, or is turned to the right or left as the front axle and wheels are steered, and at which time the joint 38 of bar 39 moves ahead somewhat and is swung to the right or left about the fifth wheel 12 as an axis. It will also be seen that said bar 39, being rigid with the axle-mounted plates as far as articulation in a vertical plane is concerned, acts to prevent possible tipping of the tractor laterally when the fork lift is turned to one side or the other.

It should be noted that also actuated by the hydraulic system of the tractor, but having no connection with the steering mechanism, are hydraulic rams 42. These rams extend between and are connected to the plate unit 37 and the side beams 10 of the fork lift a short distance above the pivotal mount of said fork lift, as shown in FIG. 1. This feature enables the fork lift to be tilted backward or forward, and in itself forms no part of this invention, since it is common in one form or another to various fork lifts.

Since the few parts which connect the fork lift mounting structure to the tractor are all removably bolted thereon, it is a simple matter to detach said structure from the tractor in order that the original axle and wheels may be remounted thereon and reconnected to the manual steering mechanism. In this case, the steering wheel 33 is of course repositioned on the post 34.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. In combination with a tractor having front wheels and a steerable axle on which said wheels are mounted, a fork lift unit, means supporting the unit from the axle for steering movement therewith, a torque and hold-down bar projecting under the tractor from adjacent the front axle centrally of the width thereof, means connecting the bar at its forward end to the axle for relative swivel movement about a vertical axis, and means on the tractor at its rear end supporting the bar adjacent the rear end thereof.

2. In combination with a tractor having front wheels and a steerable axle on which said wheels are mounted, a fork lift unit, means supporting the unit from the axle for steering movement therewith, a torque and hold-down bar projecting under the tractor from adjacent the front axle centrally of the width thereof, means connecting the bar at its forward end to the axle at a point centrally of the width and rearwardly thereof for relative swivel movement about a vertical axis, and means on the tractor at its rear end supporting the bar adjacent the rear end thereof for longitudinally guided and lateral swivel movement.

3. A structure, as in claim 2, in which the rear portion of the bar is of cylindrical form and said last named means comprises upper and lower concave rollers between which the bar passes, and tractor-mounted side plates supporting the rollers and between which said rollers are disposed.

4. In combination with a tractor having front wheels, an axle on the ends of which the wheels are mounted, means mounting the axle on the tractor for steering movement about a central vertical axis, a fork lift unit supported from the axle for steering movement therewith, and manually controlled hydraulic means mounted on the tractor and connected to the axle for steering the same; said hydraulic means comprising a hydraulic ram connected between the axle at a point laterally offset from the vertical axis thereof and a point on the corresponding side of the tractor rearwardly of the axle, a fluid pressure system including conduits connected to the ram, a rotary valve interposed in said conduits, means mounting the valve on the tractor with its axis substantially vertical, and a steering wheel connected to the valve to actuate the same.

5. In combination with a tractor having front wheels, an axle on the ends of which the wheels are mounted, means mounting the axle on the tractor for steering movement about a central vertical axis, a fork lift unit supported from the axle for steering movement therewith, manually controlled means mounted on the tractor and connected to the axle for steering the same; the axle mounting means comprising a fifth wheel unit upstanding from the axle directly in front of the tractor and including relatively turnable upper and lower members, means securing the lower member on the axle, means mounting the upper member on the tractor, arms rigid with the upper member extending thence laterally and rearwardly in clearance relation to the sides of the tractor, a connection between the arms and the tractor at a point thereon adjacent the forward end thereof, longitudinal compression bars extending rearwardly from the rear ends of and connected to the arms, and connecting means between the rear ends of the bars and the tractor.

6. A structure, as in claim 5, in which the tractor includes a rigid rear axle housing, and said connecting means comprises split brackets clamped on said axle housing in laterally spaced relation.

7. A structure, as in claim 5, in which said means mounting the upper fifth wheel member comprises a cross beam rigid with the arms, a longitudinal stub shaft fixed on the tractor centrally thereof and below the arms, and a sleeve rigid with the cross beam and turnably embracing the shaft; the connections between the compression bars and the arms and tractor including ball and socket joints.

8. In combination with a portable tractor having front wheels and a steerable axle on which said wheels are mounted, a fork-lift unit, means supporting the lift unit from the axle for limited rotation about a vertical axis, a heavy torque bar extending from adjacent the axle to the rear end of the tractor, means vertically pivoting said bar in connection with the axle rearwardly of said axis, and means on the tractor at its rear end supporting the bar adjacent the rear end thereof for longitudinally guided and lateral swivel movement.

9. In combination with a tractor having front wheels, an axle on the ends of which the wheels are mounted, means mounting the axle on the tractor for steering movement about a central vertical axis, a fork lift unit supported from the axle for steering movement therewith, manually controlled means mounted on the tractor and connected to the axle for steering the same; the axle mounting means comprising a fifth wheel unit upstanding from the axle directly in front of the tractor and including relatively turnable upper and lower members, means securing the lower member on the axle, and means mounting the upper member on the tractor; the last named means comprising arms rigid with the upper member extending thence rearwardly clear of the sides of the tractor, a cross beam rigid with the arms, a longitudinal stub shaft fixed on the tractor centrally thereof and spaced vertically from the cross beam, and a sleeve rigid with the cross beam and turnably embracing the sleeve.

References Cited in the file of this patent

UNITED STATES PATENTS

| | | |
|---|---|---|
| 2,284,237 | Stevenson | May 26, 1942 |
| 2,405,893 | Leftwich | Aug. 13, 1946 |
| 2,877,915 | Puim | Mar. 17, 1959 |
| 2,969,991 | Ulinski | Jan. 31, 1961 |
| 3,016,987 | Williamson | Jan. 16, 1962 |

FOREIGN PATENTS

| | | |
|---|---|---|
| 952,428 | Germany | Nov. 15, 1956 |
| 1,148,019 | France | June 17, 1957 |